(12) United States Patent
Beugnot et al.

(10) Patent No.: US 7,314,001 B2
(45) Date of Patent: Jan. 1, 2008

(54) COOKING APPLIANCE WITH A VESSEL COMPRISING A DRAINING DEVICE WITH A THERMAL SAFETY VALVE

(75) Inventors: Bernard Beugnot, Is-sur-Tille (FR); Dominique Federico, Ahuy (FR); Jean-Claude Bizard, Fontaine-les-Dijon (FR)

(73) Assignee: SEB S.A., Ecully (FR)

( * ) Notice: Subject to any disclaimer, the term of this patent is extended or adjusted under 35 U.S.C. 154(b) by 458 days.

(21) Appl. No.: 10/468,394

(22) PCT Filed: Sep. 30, 2002

(86) PCT No.: PCT/FR02/03329

§ 371 (c)(1),
(2), (4) Date: Aug. 29, 2003

(87) PCT Pub. No.: WO03/032794

PCT Pub. Date: Apr. 24, 2003

(65) Prior Publication Data

US 2004/0079238 A1    Apr. 29, 2004

(30) Foreign Application Priority Data

Oct. 17, 2001   (FR) .................................. 01 13397

(51) Int. Cl.
*A47J 37/12* (2006.01)
(52) U.S. Cl. .............................. 99/403; 99/330; 99/408
(58) Field of Classification Search .......... 99/330–333, 99/337, 338, 516, 403–418, 444–450, 467, 99/470; 219/441, 429, 436, 438, 439, 442, 219/530; 312/308, 329; 210/162, 167, DIG. 8; 126/20, 39.1, 275 E, 376.1, 377.1, 391.1, 126/21 A
See application file for complete search history.

(56) References Cited

U.S. PATENT DOCUMENTS

| | | | | |
|---|---|---|---|---|
| 2,118,299 A | * | 5/1938 | Ellis | 137/79 |
| 2,752,930 A | | 7/1956 | Stouder | |
| 2,867,164 A | * | 1/1959 | Lutze | 99/403 |
| 2,956,575 A | * | 10/1960 | Ammann | 137/79 |
| 3,845,702 A | | 11/1974 | Mies | |
| 3,973,481 A | * | 8/1976 | Mies | 99/408 |
| 4,273,991 A | * | 6/1981 | Barnhill | 219/440 |
| 4,325,491 A | * | 4/1982 | Barnhill | 220/316 |
| 6,666,131 B2 | * | 12/2003 | Bizard | 99/403 |

FOREIGN PATENT DOCUMENTS

| | | |
|---|---|---|
| DE | 93 15 764.9 | 3/1994 |
| DE | 199 07 150 | 8/2000 |
| DE | 19907150 A1 * | 8/2000 |
| EP | 661921 | 11/1951 |
| EP | 0 267 323 | 5/1988 |

* cited by examiner

*Primary Examiner*—Timothy F. Simone
(74) *Attorney, Agent, or Firm*—Browdy and Neimark, PLLC

(57) ABSTRACT

The invention relates to a cooking appliance comprising a case (1) and a vessel (2). Said vessel is intended to receive a cooking bath and is equipped with a draining device (10) which is used to drain the contents of the vessel (2) into a draining container (3), said container being removably-disposed in relation to the case (1). According to the invention, the draining device (10) comprises a thermostatic valve (16) consisting of a heat-sensitive mechanical element which moves according to the temperature.

19 Claims, 2 Drawing Sheets

Figure 1:
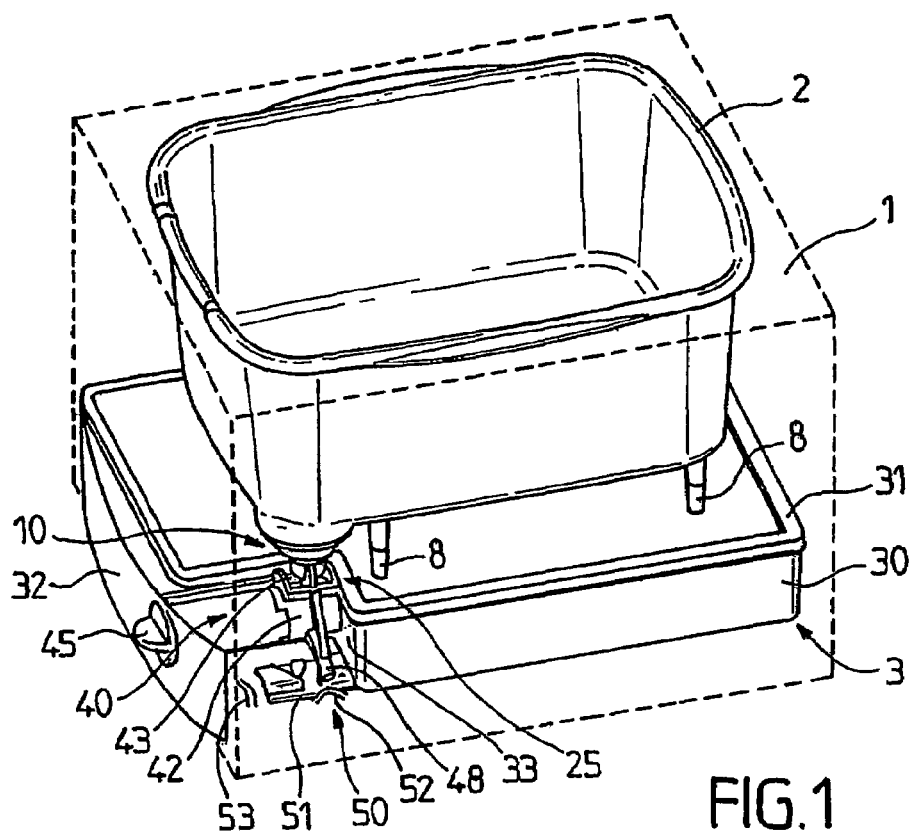

COOKING APPLIANCE WITH A VESSEL COMPRISING A DRAINING DEVICE WITH A THERMAL SAFETY VALVE

The present invention relates to the general technical field of cooking appliances having a vessel, or tank, provided to receive a cooking bath. The present invention concerns more particularly appliances of the type mentioned above comprising a device for emptying the cooking bath contained in the vessel.

The present invention concerns particularly, but not exclusively, fryers. In effect, the cooking bath is not limited to a bath of oil or of melted fat, but can equally consist of any editable material that is sufficiently fluid to flow through an emptying device, and particularly a water-based liquid.

The patent documents U.S. Pat. No. 2,597,695, CH 325 786 and FR 2 665 068 disclose fryers having an emptying conduit. However, none of them provides for a receptacle for collecting cooking liquid. The patent document FR 2 773 976 describes a fryer having an emptying conduit and a receptacle supported by a drawer mounted in the housing of the appliance. The utilization of such appliances requires careful attention on the part of the user with regard to the emptying of oil out of the housing.

The U.S. Pat. No. 2,867,164 document describes a fryer of the industrial type having a vessel and an emptying receptacle housed in a frame. The vessel has an emptying conduit closed by a gate, or valve. The emptying receptacle is mounted in a removable manner on the inner face of a door of the frame. The transposition of such a form of construction into a household appliance appears to present safety issues.

The document DE 1 99 07 150 describes a cooking appliance whose vessel has an emptying conduit equipped with a motorized valve. The control device of the motor can have a temperature sensor permitting emptying of the vessel to be avoided as long as the temperature of the contents of the vessel is too high. Such a construction can be envisioned for an industrial or professional appliance but proves to be too costly for a domestic appliance.

The object of the present invention is to increase the safety of cooking appliances having a vessel provided with an emptying device.

Another object of the present invention is to provide an appliance of the type described above having a compact and economical structure.

These objects are achieve with a cooking appliance having in a housing a vessel provided to receive a cooking bath, furnished with an emptying device provided for pouring of the contents of the vessel into an emptying receptacle arranged in a removable manner with respect to the housing, by the fact that the emptying device has a thermostatic valve comprising a thermosensitive mechanical organ movable as a function of temperature. The thermosensitive mechanical organ is for example a bimetallic part, a part made of a shape memory alloy or a wax piston. Due to the mechanical organ that is movable as a function of temperature, the thermostatic valve can present an open configuration or a closed configuration as a function of the temperature level. Thus, emptying of the contents of the vessel can be prevented as long as the temperature of the cooking bath exceeds a certain threshold. This arrangement permits an improvement in the safety of the appliance by limiting the risks of burns during handling of the empty receptacle. In addition, materials that are less noble and thus less costly can be utilized for fabrication of the emptying receptacle, such as for example polypropylene. The emptying receptacle can be disposed in the housing or can form a base on which the housing rest. The vessel can be removable and can be placed in a dishwasher. The thermostatic valve of the emptying device permits attainment of safety independent of an opening and closing control operated by the user. In addition, such a constructions is less costly, no motor being necessary to activate the thermostatic valve.

Advantageously, the thermostatic valve is arranged in a conduit opening into the bottom of the vessel. This arrangement permits emptying to be facilitated.

Advantageously, a filter is arranged upstream of the thermostatic valve. This arrangement permits residue present in the cooking bath to be prevented from affecting the operation of the thermostatic valve. This arrangement also permits an improvement in the quality of the cooking bath during successive frying operations with the same bath.

According to one embodiment, the thermostatic valve has a bimetallic snap action disk. Other embodiments can equally be envisioned, for example, a thermostatic valve having a wax piston or even a part made of the shape memory alloy.

Advantageously, the emptying device has a second valve comprising a movable blocking part maneuvered by a maneuvering button. This arrangement permits the user to control emptying.

Advantageously then, the thermostatic valve is arranged between the vessel and the second valve. This arrangement permits a thermal contact between the cooking bath and the movable organ as a function of the temperature of the thermostatic valve to be envisioned. There results therefrom a more rapid reaction of the valve as much during a rise in temperature of the cooking bath as during cooling.

Advantageously then, the maneuvering button drives the movable blocking part through the intermediary of a control mechanism mounted on the emptying receptacle. Thus, in the absence of the emptying receptacle, the user does not risk proceeding to empty the appliance. In addition, the installation of the control mechanism on the emptying receptacle facilitates construction of a removable vessel. The emptying receptacle can be disposed in the housing or can even form a base on which the housing rests.

Advantageously, the maneuvering button drives the control mechanism and is installed on the emptying receptacle. This arrangement permits construction to be simplified. Alternatively, the maneuvering button can for example be mounted on the housing.

Advantageously, the housing has a lateral opening in which the emptying receptacle can be at least partially inserted. This arrangement permits manipulation of the emptying receptacle to be facilitated. Alternatively, the housing can for example be made in two parts, an upper part at least partially surrounding the vessel, and a lower part supporting the emptying reservoir, the upper part being retracted for access to the emptying reservoir.

Advantageously then, the maneuvering button is mounted on an exterior lateral face of the emptying receptacle. This arrangement permits construction to be simplified. Alternatively, maneuvering button can for example be accessible through a door arranged on a face of the housing.

Advantageously, the vessel is removable with respect to the housing.

Figure 2:
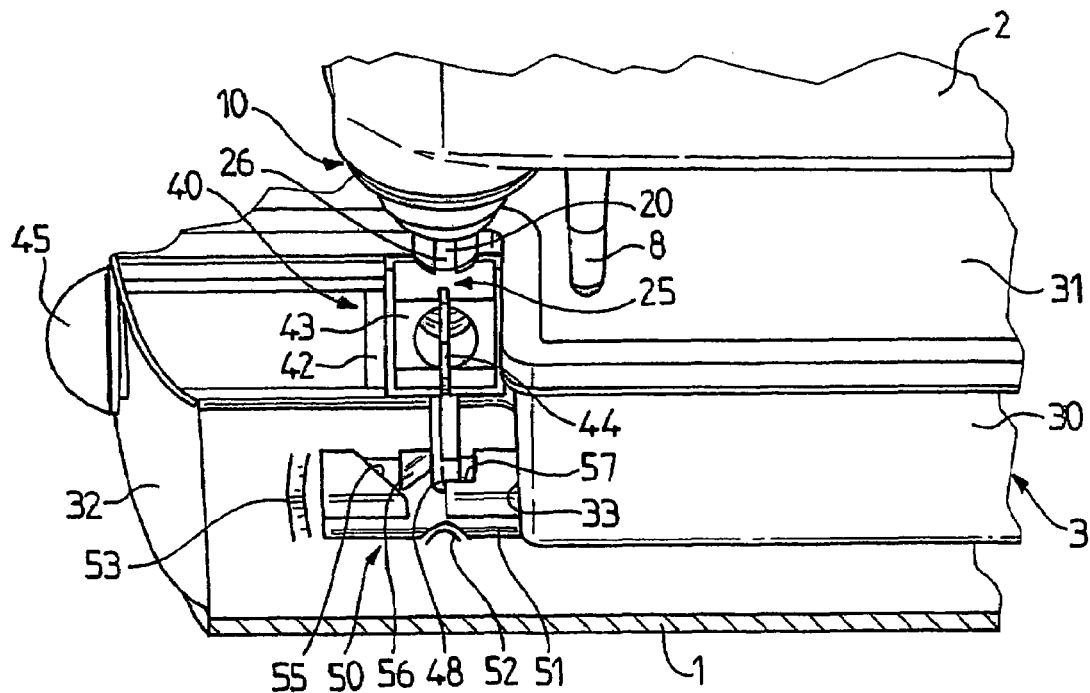
Figure 3:
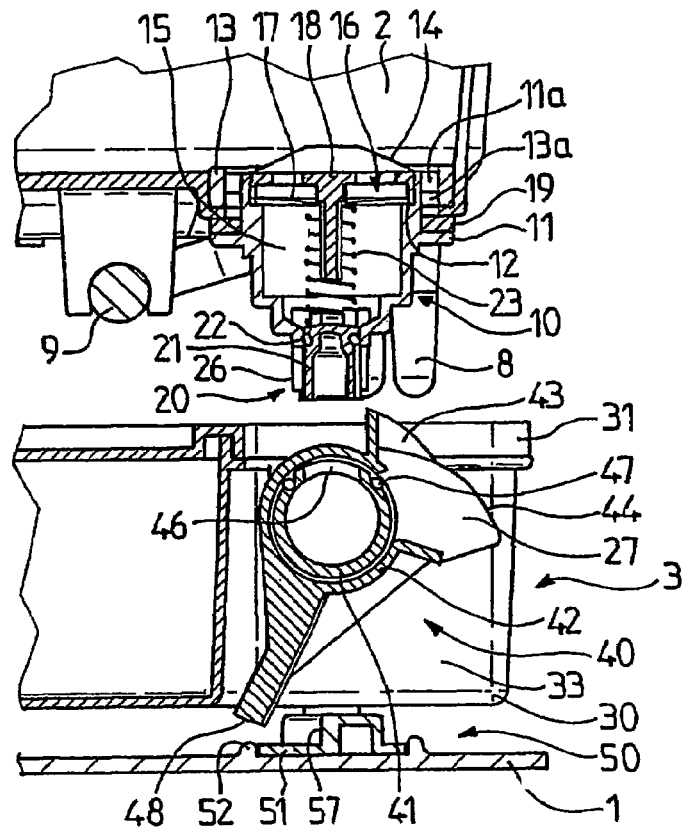
Figure 4:
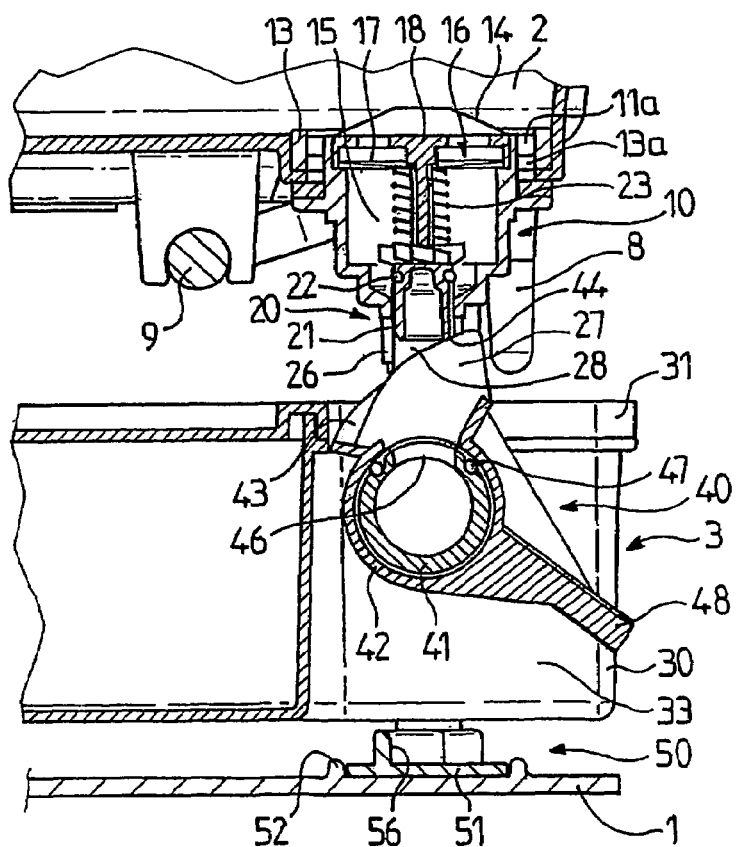

The invention will be better understood from a study of the following example of construction, which is not in any way limiting, illustrated in the attached figures in which:

FIG. 1 is a view showing a cooking appliance according to the invention in the position provided for emptying the contents of the vessel, the exterior housing being shown in broken lines, FIG. 2 is a partial view of the appliance shown in FIG. 1, in a position after emptying of the vessel, showing the safety device provided to prevent two successive emptyings without retracting of the emptying receptacle, FIG. 3 is a partial view in transverse cross section of the appliance shown in FIG. 1, in a position after emptying of the vessel, FIG. 4 is a partial view in transverse cross section of the appliance shown in FIG. 1, in the position provided for emptying the contents of the vessel.

The appliance illustrated in FIGS. 1 to 4 is a fryer having a housing 1 presenting an upper opening receiving a vessel 2 provided to receive a cooking liquid. The upper opening can be closed by a lid, not shown in the figures. Housing 1 equally presents a lateral opening in which an emptying receptacle 3 is engaged.

As is more clearly visible in FIGS. 3 and 4, vessel 2 has an emptying device 10. Vessel 2 is advantageously removable and has means, such as feet 8, provided to permit the vessel to be placed on a working surface. If desired, electric heating means 9 can be fixed under vessel 2. By way of a variant, the electric heating means can be arranged in housing 1 or even in vessel 2.

Emptying device 10 comprises an evacuation conduit 15 extending from the bottom of vessel 2. Conduit 15 is protected by a filter 14. A spring-loaded valve 20 blocks the lower part of conduit 15. A thermostatic valve 16 is arranged between filter 14 and spring-loaded valve 20.

Conduit 15 is formed by a body 11 advantageously made of a plastic material resistant to the high temperatures of the cooking bath, for example A model resistant up to 250° C. in case of a fryer. Body 11 is mounted to be removable with respect to vessel 2. A seal 19 is interposed between vessel 2 and body 11. Seal 19 is advantageously secured to body 11 in order to prevent loss during disassembly of the emptying device or omission during reassembly of said device.

Filter 14 is removably mounted with respect to vessel 2 and body 11. According to the example of construction illustrated in the figures, filter 14 is fixed to a ring 13 assembled by a bayonet connection with body 11. Ring 13 is housed in a removable manner in a recess of the bottom of vessel 2. Ring 13 is immobilized in rotation with respect to vessel 2. The upper part of body 11 is engaged in an opening formed in the bottom of vessel 2, and carries ramps 11a cooperating with ramps 13a of ring 13 to form the bayonet assembly.

Thermostatic valve 16 comprises a bimetallic snap-action disk 17 fixed on the lower face of a perforated plate 18 blocking the upper end of body 11. Plate 18 is for example crimped to the interior of body 11.

Bimetallic snap-action disk 17 forms a thermosensitive mechanical organ that is moveable as a function of temperature. Disk 17 is represented in FIGS. 3 and 4 in the open position corresponding to the low temperature position. Disk 17 in the high temperature position blocks conduit 15. The temperature of transition between the high temperature position and the low temperature position during cooling is for example of the order of 90° C. in the case of the a fryer.

By way of example, this disk is made from a bimetallic laminate and has a diameter of 30 mm. In the closed position, the disk 17 is curved toward the bottom and its periphery comes to bear against an internal annular shoulder 12 of body 11. Valve 16 is thus closed. In the open position, disk 17 is curved in the other direction, thus toward the top, and provides a passage toward the orifices of perforated plate 18. Liquid can then pass through thermostatic valve 16.

Spring-loaded valve 20 has a movable blocking part 21 equipped with a toroidal peripheral seal 22. Part 21 is mounted on a spring 23 bearing against the lower face of the disk 17. The rest position of spring 23 corresponds to FIG. 3 in which spring-loaded valve 20 is closed.

Emptying receptacle 3 has a volume sufficient to receive the cooking bath contained in vessel 2. Emptying receptacle 3 has a recovery trough 30 closed by a lid 31. Emptying receptacle 3 has an outer lateral face 32. If desired, face 32 can be made at least partially of transparent or translucent material in order to permit the user to see the filling of emptying receptacle 3.

Emptying receptacle 3 also comprises an emptying control mechanism 40 which can advantageously be mounted on recovery trough 30. Control mechanism 40 comprises a movable control piece 42 mounted around an inlet conduit 41 that opens into a lateral wall 33 of trough 30. Movable control piece 42 presents a funnel 43 and a cam 44 provided to actuate spring-loaded valve 20. Movable control piece 42 is connected to a maneuvering button 45 mounted on the outer lateral face 32 of emptying receptacle 3. Maneuvering button 45 drives piece 42 in rotation. The lateral wall of conduit 41 has a filling opening 46 surrounded by a toroidal seal 47 in a manner to assure a secure seal between conduit 41 and movable control piece 42. Maneuvering button 45 is movable between a utilization position corresponding to the position shown in FIGS. 2 and 3 and an a position called the emptying position corresponding to the position shown in FIGS. 1 and 4. In the emptying position, shown most clearly in FIG. 4, funnel 43 is disposed above filling opening 46, and cam 44 pushes valve 20.

The appliance includes a safety device 25 constructed to prevent withdrawal of emptying receptacle 3 when valve 20 is opened. For this purpose, the lower end of conduit 15 has a longitudinal slot 26, and cam 44, arranged as a part of funnel 43, comes to be inserted into slot 26 during rotation of movable control piece 42 toward the emptying position, as shown in FIG. 4. Control mechanism 40 thus includes a bolt 27 provided to cooperate with a striking plate 28 forming a part of valve 20 when valve 20 is in its opened position, bolt 27 being formed by a lateral face of cam 44, striking plate 28 being formed by slot 26.

The appliance according to the invention includes another safety device 50 that acts to prevent two consecutive emptyings.

For this purpose, a movable safety piece 51 is arranged between housing 1 and emptying receptacle 3. Piece 51 is guided in longitudinal translation by guide abutments 52. The longitudinal movement of piece 51 is limited by stops 53. An upper flexible blade mounted on piece 51 is provided to come to abut against emptying receptacle 3 during introduction of said receptacle into housing 1, then to bear against emptying receptacle 3 when piece 51 is blocked by one of the abutments 53.

Piece 51 includes a first cam 55 provided to cooperate with a foot 48 extending from movable control piece 42 when maneuvering button 45 has been brought to its emptying position after introduction of emptying receptacle 3. Piece 51 includes a second cam 56 provided to cooperate with foot 48 when maneuvering button 45 is moved into its utilization position after an emptying operation. Piece 51 includes a blocking abutment 57 provided to block rotation of movable control piece 42 when maneuvering button 45 is urged toward the emptying position after a new utilization without withdrawal of emptying receptacle 3.

The present embodiment functions in the following manner.

When vessel 2 is in place in housing 1, the appliance is ready for cooking. When emptying receptacle 3 is in place in housing 1, the user can control emptying by means of maneuvering button 45. Cam 44 comes to be inserted into slot 26 and pushes movable blocking part 21 of valve 20.

However, according to the invention, emptying can not occur as long as bimetallic snap-action disk 17 is in the high temperature position. Thermostatic valve 16 is then in the closed position. When the temperature of disk 17 in contact with the liquid has reach the reversal threshold, thermostatic valve 16 opens.

The opening temperature of thermostatic valve 16 during cooling permits selection, for the emptying receptacle and/or the control mechanism, of materials having a limited temperature resistance. In addition, the risk of burning during handling of emptying receptacle 3 are reduced.

Spring-loaded valve 20 permits emptying to be prevented if emptying receptacle 3 is not in place in housing 1. When emptying receptacle 3 is in place, the user turns maneuvering button 45 and cam 44 pushes movable part 21 of valve 20. The contents of the vessel can then flow into emptying receptacle 3 if thermostatic valve 16 is in the open position.

Safety device 25 permits withdrawal of emptying receptacle 3 from housing 1 to be avoided due to the insertion of bolt 27 into slot 28 when control mechanism 40 is in the emptying position, cam 44 pushing movable part 21 of valve 20.

Safety device 50 prevents a second emptying from being performed if receptacle 3 has not been withdrawn at least partially by a certain amount from housing 1 and then put back in place, through the intermediary of displacements of piece 51 during maneuvering of control device 40 from the utilization position toward the emptying position and back, as well as during withdrawal and then reintroduction of emptying receptacle 3.

According to a variant, emptying control mechanism 40 need not be secured to recovery trough 30, and can for example be mounted on lid 31 of emptying receptacle 3.

According to a variant, maneuvering button 45 can be mounted on a lateral face of the emptying receptacle housed within the housing when said receptacle is installed in the housing. The maneuvering button can then be accessible through a door provided in the lateral wall of the housing.

According to a variant, maneuvering button 45 can be mounted on housing 1 of the appliance, for example opposite the lateral window of the housing provided for insertion of the emptying receptacle. The connection between the maneuvering button and the control mechanism then takes place upon insertion of the emptying receptacle into the housing.

According to a variant, emptying receptacle 3 can form a base receiving, in a removable manner, the housing surrounding the vessel.

The present invention is not in any way limited to the exemplary embodiment described and to its variants, but encompasses numerous modifications in the framework of the claims.

The invention claimed is:

1. Cooking appliance having in a housing (1) a vessel (2) provided to receive a cooking bath, furnished with an emptying device (10) provided for pouring of the contents of the vessel (2) into an emptying receptacle (3) arranged in a removable manner with respect to the housing (1), wherein said emptying device (10) comprises a thermostatic valve (16) and a second valve (20), both of said valves being in the path of flow or the contents or said vessel to said emptying receptacle, said thermostatic valve being disposed upstream of said second valve with respect to the direction of flow of the contents of said vessel to said emptying receptacle, said thermostatic valve comprising a thermosensitive mechanical organ movable as a function of temperature to prevent emptying of said vessel as long as the temperature of the cooking bath exceeds a selected threshold and to open said thermostatic valve in response to the temperature of the cooking bath dropping below the selected threshold, and wherein said second valve comprises a movable blocking part (21) maneuvered by a maneuvering button (45).

2. Cooking appliance according to claim 1, characterized in that the thermostatic valve (16) is arranged in a conduit (15) opening into the bottom of the vessel (2).

3. Cooking appliance according to claim 1, characterized in that a filter (13) is arranged upstream of the thermostatic valve (16).

4. Cooking appliance according to claim 1 characterized in that the thermostatic valve (16) has a bimetallic snap action disk (17).

5. Cooking appliance according to claim 1 characterized in that the thermostatic valve (16) is arranged between the vessel (2) and the second valve (20).

6. Cooking appliance according to claim 5 characterized in that the maneuvering button (45) drives the movable blocking part (21) through the intermediary of a control mechanism (40) mounted on the emptying receptacle (3).

7. Cooking appliance according to claim 6 characterized in that the maneuvering button (45) driving the control mechanism (40) is mounted on the emptying receptacle (3).

8. Cooking appliance according to claim 7, characterized in that the housing (1) has a lateral opening in which the emptying receptacle (3) can be at least partially inserted and in that the maneuvering button (45) is mounted on an exterior lateral face (32) of the emptying receptacle (3).

9. Cooking appliance according to claim 1 characterized in that the housing (1) has a lateral opening in which the emptying receptacle (3) can be at least partially inserted.

10. Cooking appliance according to claim 1 characterized in that the vessel (2) is removable with respect to the housing (1).

11. Cooking appliance according to claim 1 characterized in that said thermosensitive mechanical organ is operative to maintain said thermostatic valve closed to prevent pouring of the contents of the vessel into the emptying receptacle when the cooking bath is above a selected threshold temperature and to open said thermostatic valve when the cooking bath is at or below the selected threshold temperature.

12. Cooking appliance according to claim 1, wherein said appliance further comprises means for permitting opening of said second valve only when the emptying receptacle is in position to receive the contents of the vessel.

13. Cooking appliance according to claim 1, wherein said appliance further comprises a safety device coupled to said second valve and operative to prevent two consecutive emptyings of the vessel unless the receptacle has been at least partially withdrawn from the housing at a time between the consecutive emptyings.

14. Cooking appliance having in a housing (1) a vessel (2) provided to receive a cooking bath, furnished with an emptying device (10) provided for pouring of the contents of the vessel (2) into an emptying receptacle (3) arranged in a removable manner with respect to the housing (1), wherein said emptying device (10) comprises a thermostatic valve (16) and a second valve (20), both of said valves being in the path of flew of the content of said vessel to said emptying receptacle, said thermostatic vale being disposed upstream of said second valve with respect to the direction of flow of the contents of said vessel to said emptying receptacle, said thermostatic valve comprising a thermosensitive mechanical organ movable as a function of temperature to prevent emptying of said vessel as long as the temperature of the cooking bath exceeds a selected threshold and to open said thermostatic valve in response to the temperature of the cooking bath dropping below the selected threshold, and wherein said thermostatic valve (16) is arranged in a conduit (15) opening into the bottom of the vessel (2) and delimiting the path of flow of the contents of said vessel to said emptying receptacle, said second valve is a spring-loaded valve blocking a lower part of said conduit, and the thermosensitive mechanical organ is a snap action disk (17).

15. Cooking appliance according to claim 14, wherein said further appliance comprises means for allowing opening of said spring-loaded valve only when the emptying receptacle is in position to receive the contents of the vessel.

16. Cooking appliance according to claim 14, wherein said appliance further comprises a safety device coupled to said spring-loaded valve and operative to prevent two consecutive emptyings of the vessel unless the receptacle has been at least partially withdrawn from the housing at a time between the consecutive emptyings.

17. Cooking appliance having in a housing (1) a vessel (2) provided to receive a cooking bath, furnished with an emptying device (10) provided for pouring of the contents of the vessel (2) into an emptying receptacle (3) arranged in a removable manner with respect to the housing (1), wherein said emptying device (10) comprises a thermostatic valve (16) and a second valve (20), both of said valves being in the path of flow of the contents or said vessel to said emptying receptacle, said thermostatic valve being disposed upstream of said second valve with respect to the direction of flow of the contents at said vessel to said emptying receptacle, said thermostatic valve comprising a thermosensitive mechanical organ movable as a function of temperature to prevent emptying of said vessel as long as the temperature of the cooking bath exceeds a selected threshold and to open said thermostatic valve in response to the temperature of the cooking bath dropping below the selected threshold, wherein said thermostatic valve (16) is arranged in a conduit (15) opening into the bottom of the vessel (2) and delimiting the path of flow of the content of said vessel to said emptying receptacle, said second valve is a spring-loaded valve blocking a lower part of said conduit, and said housing (1) has a lateral opening in which the emptying receptacle (3) can be at least partially inserted.

18. Cooking appliance according to claim 17, wherein said appliance further comprises means for permitting opening of said spring-loaded valve only when the emptying receptacle is in position to receive the contents of the vessel.

19. Cooking appliance according to claim 17, wherein said appliance further comprises a safety device coupled to said spring-loaded valve and operative to prevent two consecutive emptyings of the vessel unless the receptacle has been at least partially withdrawn from the housing at a time between the consecutive emptyings.

* * * * *